B. SUTTER.
FIREPROOF INSULATING BUILDING MATERIAL AND PROCESS OF PRODUCING THE SAME.
APPLICATION FILED OCT. 10, 1913.
1,183,694.  Patented May 16, 1916.
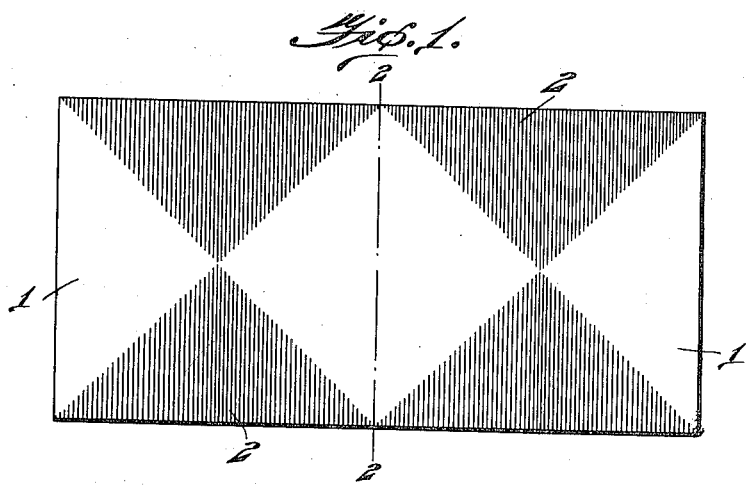
Witnesses  Inventor
  Balthasar Sutter
  By
  Foster Freeman Watson & Coit
  Attorneys

UNITED STATES PATENT OFFICE.

BALTHASAR SUTTER, OF NEW YORK, N. Y.

FIREPROOF INSULATING BUILDING MATERIAL AND PROCESS OF PRODUCING THE SAME.

1,183,694.  Specification of Letters Patent.  Patented May 16, 1916.

Application filed October 10, 1913. Serial No. 794,486.

*To all whom it may concern:*

Be it known that I, BALTHASAR SUTTER, a citizen of the United States, and resident of the borough of Bronx, city of New York, county of Bronx, and State of New York, have invented certain new and useful Improvements in Fireproof Insulating Building Materials and Processes of Producing the Same, of which the following is a specification.

The various materials at present utilized for insulating purposes, such as corkboard, granulated cork, saw-dust, mineral wool, wood shavings, charcoal, fiber, flax, pumice stone, kiesel-guhr, asbestos, etc. have many disadvantages, chiefly that they do not possess structural strength, are hygroscopic, inflammable and disintegrate readily. Where a binder is used, the natural resins are customarily employed for that purpose, by subjecting the product to pressure under heat, so that the finished product is not fireproof but will burn.

It has been my object to avoid the objections to the materials above mentioned and to produce a composition which will have great insulating value and which at the same time will possess great structural strength and heat resisting properties and the other advantages hereinafter explained.

The novel features of the invention will be apparent from the following description taken in connection with the accompanying drawing.

In the drawing, Figure 1 is a face view of a block made of my material and having a colored design on its face; and Fig. 2 is a cross section on the line 2—2 of Fig. 1 showing one construction which may be used.

In the drawing, I have shown one form of block which may be made from my material and which embodies various features which may be used but some of which may be omitted if desired. As shown in Fig. 1 the main block 1 has portions 2 of the smooth surface of the material colored in any suitable design. The body of the block itself is composed of my material and I have shown the center layer 3 as embodying coarse particles of cork or other granulated vegetable fiber whereas the outer layers 4, 5 are made up of finer particles so as to make the outer surface smooth and adapted to receive a better finish. A wire mesh strengthening material 6 may be embedded in the block to reinforce it and strengthening metal rods 7 may also be used. In making the block a layer 8 of fire-proof or waterproof material may be added if desired and this layer may be composed of various materials as explained hereafter.

My invention relates to an improvement in a fire-proof insulating building material of equal or greater insulating value than any of the insulating materials in general use at the present time with the additional advantages that it possesses great structural strength and therefore requires no supporting walls, is fireproof, non-hygroscopic, sound-deadening, non-warping, and that it may be worked the same as wood, and that it readily takes any finish that may be placed on wood, or any enamel "baking" or otherwise, such as is used on enameled iron ware. It may present a smooth surface for veneering, varnishing, polishing, enameling, plastering, cementing, or applying other finishes.

Another advantage of my material is that it can be cast or molded into any shape or form, and that it may be readily dyed or colored.

A further advantage of my product is that during the process of manufacture the product is not charred or burned and that it retains all its natural resins.

In carrying out my invention in one specific form, I proceed by mixing sufficient powdered oxid of magnesia with granulated cork to completely cover or coat each particle of cork and then add a solution of acetyl cellulose as binder. After thoroughly mixing this mass, it is placed into a mold and subjected to sufficient pressure to form one homogeneous mass. The amount of pressure varies with the nature and grade of the raw material used, but an excess of pressure must be avoided as it might destroy the minute air cells in the finished product.

To produce a product with one or more smooth surfaces suitable for applying varnish or polish, I proceed by first placing into the mold a quantity of finely ground cork treated with powdered oxid of magnesia and a solution of acetyl cellulose as above described. I then pour into this a similar mixture containing coarsely granulated cork, and then an additional quantity of the mixture containing finely ground cork. The whole is then subjected to sufficient pressure to form one homogeneous mass. I may use any number of layers of mixture of various coarseness or even of varying ingredients; I may in like manner when desired insert one or more layers of wire cloth, mesh wire, metallic rods or other suitable reinforcing material as shown. I may in like manner insert one or more layers of waterproofing materials, such as pitch, tar, asphaltum, waterproof paint, tar paper, rubberoid, acetyl cellulose, etc. I may also insert one or more layers of chlorid of magnesia, asbestos or other fireproofing clays; I may also add any suitable dye or coloring matter to my mixture and thus color one or more or all layers any desired shade; I may also proceed by dyeing the cork or other waste material I use before making the mixture. I may also use for my outer layer assorted mixtures dyed in different colors to produce artistic figures and designs.

In carrying out my invention, I do not confine myself to the materials mentioned in the foregoing illustration. In place of the granulated cork I may use other suitable waste materials, such as granulated corn cobs, peat, seaweed, saw-dust, wood flour, granulated wood or other fibrous material. In place of the powdered oxid of magnesia I may use to equal advantage asbestos or any of the other fireproofing clays of commerce. As binder I may substitute any other fireproof cements or liquids now commercially known. I use the binder most suitable to the particular raw material used.

Having now described my invention, what I claim as new and desire to secure by Letters Patent is:

1. The process of making a fireproof insulating material of great structural strength which consists in mixing granulated vegetable matter in its natural state with granulated mineral matter until each particle of vegetable matter is coated with the mineral matter, mixing the product with a binder in fluid condition and compressing the material into a homogeneous mass.

2. The process of making a fireproof insulating material of great structural strength which consists in separately mixing granulated vegetable matter of different degrees of coarseness with a binder and fine mineral matter until the particles are coated, placing the materials in layers and compressing the material into a homogeneous mass.

3. The process of making a fireproof insulating material of great structural strength which consists in separately mixing granulated vegetable matter of different degrees of coarseness with fine mineral matter and a binder until the particles are coated, placing the materials in layers and interposing a layer of waterproof material between layers of the material, embedding metallic strengthening rods in the material, and compressing the material into a homogeneous mass.

4. As a new product a composition of matter consisting of finely ground or granulated vegetable matter, retaining all its natural resins, each particle coated with a fireproof clay and some suitable binder, the coated particles being in close contact with each other in one homogeneous mass of great structural strength, fireproof and possessing high insulating, non-hygroscopic and sound-deadening properties, substantially as described.

5. As a new product a composition of matter consisting of layers of ground or granulated vegetable matter, retaining all its natural resins, the layers made up of material of different degrees of coarseness, each particle being coated with a fireproof clay and some suitable binder, the coated particles being in close contact with each other in one homogeneous mass of great structural strength, fireproof and possessing high insulating, non-hygroscopic and sound-deadening properties, with a smooth surface for veneering, varnishing, polishing, enameling, plastering, cementing, or applying other finishes, substantially as described.

6. As a new product a composition of matter consisting of an outer layer of finely ground and an inner layer of coarsely ground or granulated vegetable matter, retaining all its natural resins, each particle being coated with a fireproof clay and some suitable binder, the coated particles being in close contact with each other in one homogeneous mass having great structural strength, fireproof and possessing high insulating, non-hygroscopic and sound-deadening properties, with the outer surface smooth for veenering, varnishing, polishing, enameling, plaster, cementing or applying other finishes, substantially as described.

7. A new article of manufacture consisting of ground or granulated vegetable matter, retaining all its natural resins, each particle being coated with a fireproof clay and some suitable binder and reinforced with metallic strengthening members embedded therein, the coated particles being in close contact with each other in one homogeneous mass, having great structural strength, fireproof and possessing high insulating, non-hygroscopic and sound-deadening properties, with a rough surface and one or more surfaces smooth for veneering, varnishing, polishing, enameling, plastering, cementing or applying other finishes, substantially as described.

8. As a new product a composition of matter consisting of ground or granulated vegetable matter, retaining all its natural resins, each particle being coated with a fireproof clay and some suitable binder, containing one or more layers of pitch, tar, asphaltum, waterproof paint, tar paper, rubberoid, acetyl cellulose or other waterproofing material, the coated particles being in close contact with each other in one homogeneous mass having great structural strength, fireproof and possessing high insulating, non-hygroscopic and sound-deadening properties, with rough surfaces and one or more surfaces smooth for veneering, varnishing, polishing, enameling, plastering, cementing or applying other finishes, substantially as described.

9. A new article of manufacture consisting of ground or granulated vegetable matter, retaining all its natural resins, each particle being coated with a fireproof clay and some suitable binder, reinforced with metallic strengthening members and containing one or more layers of pitch, tar, asphaltum, tar paper, rubberoid, acetyl-cellulose or other waterproofing material or waterproof paint, molded or compressed into one homogeneous mass, having great structural strength, fireproof and possessing high insulating, non-hygroscopic and sound-deadening properties, with rough surfaces and one or more surfaces smooth for veneering, varnishing, polishing, enameling, plastering, cementing or applying other finishes, substantially as described.

In testimony whereof I affix my signature in presence of two witnesses.

BALTHASER SUTTER.

Witnesses:
 CARL HILLE,
 MAX P. ARLT.